A. L. HIGGINS.
MILK BOTTLE TOP EXTRACTOR.
APPLICATION FILED MAY 1, 1914.
1,142,707.
Patented June 8, 1915.
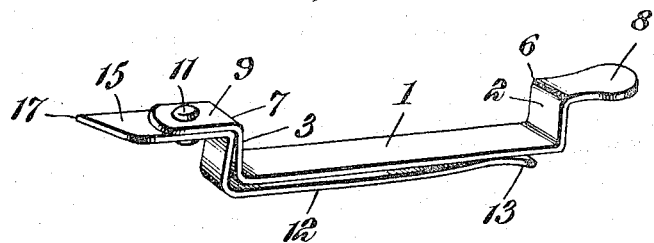
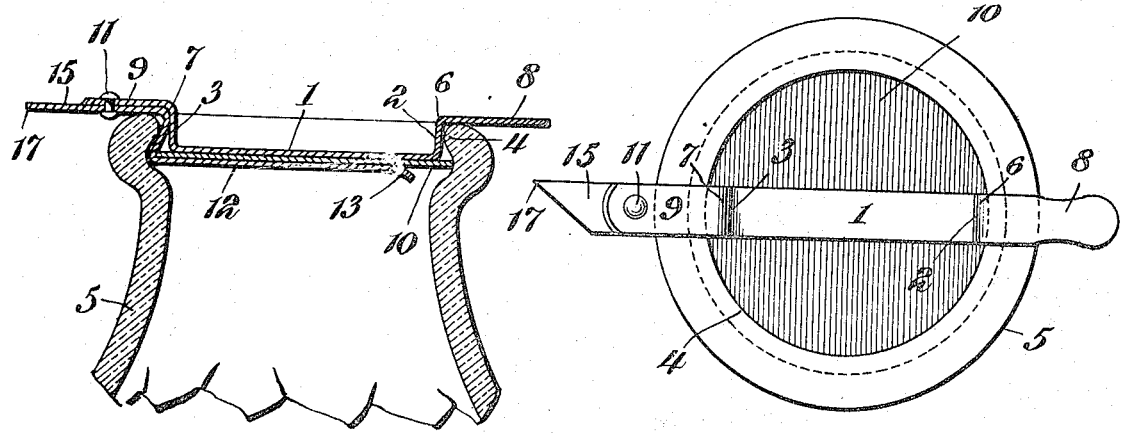
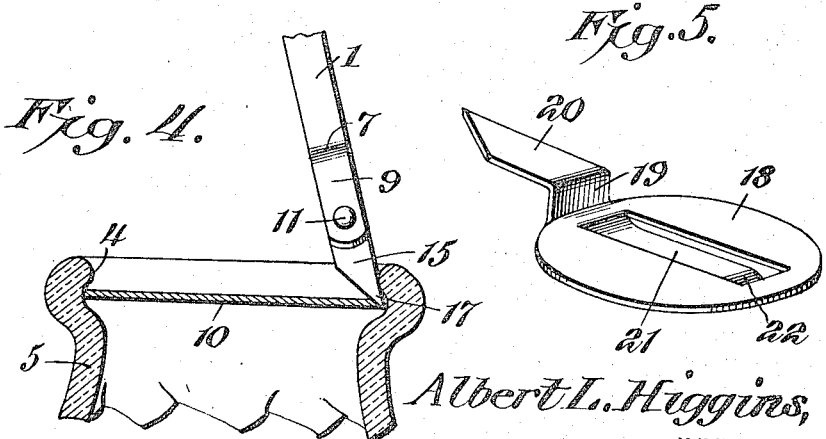
Albert L. Higgins,
INVENTOR,
WITNESSES

UNITED STATES PATENT OFFICE.

ALBERT L. HIGGINS, OF BAR HARBOR, MAINE.

MILK-BOTTLE-TOP EXTRACTOR.

1,142,707.   Specification of Letters Patent.   Patented June 8, 1915.

Application filed May 1, 1914.   Serial No. 835,647.

*To all whom it may concern:*

Be it known that I, ALBERT L. HIGGINS, a citizen of the United States, residing at Bar Harbor, in the county of Hancock and State of Maine, have invented a new and useful Milk-Bottle-Top Extractor, of which the following is a specification.

This invention relates to improvements in devices for removing the tops or covers from milk jars.

The object is to provide a simple device of this character which may be readily operated to puncture the ordinary pasteboard disk used to seal the milk bottles in common use, and by a simple prying movement to remove the same from the top of the bottle without the danger of plunging the said disk into the mouth of the bottle, and thus splashing the milk about and wasting the same.

Another object is to embody in such a device means for holding the said pasteboard disk or top thereto, so that it may not become lost, and at the same time the device may be readily utilized, while thus holding the top or disk, to reintroduce or replace the same into the mouth of the milk bottle and force it onto its seat, thus re-sealing the bottle after a portion of its contents have been used, the device, while in such use, remaining with the top or disk and being always ready for removing the same until the bottle is empty and the disk is discarded.

Another object is to provide a device of this character which may be cheaply manufactured of some suitable metal, and may be used as an advertising medium by stamping the same with the desired advertising matter.

With these and other objects in view, the invention consists in the construction and novel combination of parts hereinafter fully described, illustrated in the accompanying drawing, and specifically pointed out in the claims hereto appended: it being understood that various changes in the form, size, proportion and minor details of construction may be resorted to without departing from the spirit or sacrificing any of the advantages of this invention.

In the drawing, in which like reference characters designate corresponding parts in each of the several figures, excepting Figure 5—Fig. 1 is a perspective view of the device. Fig. 2 is a longitudinal sectional view of the same shown supporting the disk or top in its proper position in the mouth of a milk bottle. Fig. 3 is a plan view of Fig. 2. Fig. 4 is a sectional view showing a portion of the device as the latter is used in removing the disk from the bottle. Fig. 5 is a perspective view of a slightly modified form of the invention.

The device of the present invention, as illustrated in Figs. 1 to 4, inclusive, consists of a comparatively narrow strip of thin, stiff metal formed into a horizontally disposed body portion 1, which is adapted to be stamped with suitable advertising matter, and is of a length to be readily introduced crosswise into the mouth of the ordinary milk bottle. The metallic strip is then bent approximately perpendicularly to the body portion 1 at each end thereof to form vertical walls 2 and 3, which are of a height exceeding the distance between the seat of the milk bottle and the top of the bottle neck, and are adapted to lie close to the inner side of the internal, circumferential bead 4 of the bottle 5. The terminal portions of the metallic strip are then bent outwardly in a plane substantially parallel with the body portion 1, and in opposite directions, as indicated at 6 and 7, to form, respectively, the handle 8 and the extension 9, which are adapted to lie when in engagement with the disk or top 10 across the open mouth of the bottle 5 to prevent the device from falling into the same.

The extension 9 is perforated to receive a rivet 11 which secures a spring clip member 12 thereto. The said spring clip member is formed of the same size of strip as the body member and has approximately the same contour as the adjacent portion of the body member 1, and is provided at its inner free end wtih a slight downward bend 13 to form an open entrance to facilitate the application of the device to the top or disk 10.

The main spring clip 12 is spaced slightly away from the body member 1 throughout the major portion of its length to provide room for the said disk 10. The other or outer end of the strip forming the spring clip 12 is extended beyond the rivet 11 a sufficient distance to form a spur or prong 15, it being preferable to bevel one side only of said extension, to produce the necessary point 17.

In Fig. 4 of the drawing the device of the present invention is shown as being used to remove the top from a milk bottle in such manner as to preserve the said top or disk intact, so that the same may be applied to the bottle repeatedly and removed therefrom by holding the said disk within the spring clip of the device, as shown in Figs. 2 and 3 of the drawing. In said Fig. 4, the point 17 is inserted between the edge of the disk 10 and the inner circumferential bead 4 of the bottle 5, the beveled edge being preferably toward the center of the disk 10, and by pressing the device outwardly the straight edge of the prong fulcrums upon the upper edge of the bottle, and the point 17 pries the disk from its seat therein without puncturing the same, and thus preserves the disk for repeated applications to the bottle by means of the present device. Where, however, it is not desired to preserve the disk for further use, the same may be removed from the bottle by simply puncturing the same, at any point, by the spur 15, as in the ordinary manner.

In Fig. 5 of the drawing is shown a somewhat modified form of the device, wherein the aforementioned handle 8 is dispensed with, and the entire device is formed from a single piece of suitable sheet metal. In this form a body portion in the form of a circular disk 18 is provided, of a diameter somewhat less than the diameter of the pasteboard top or disk 10, so that the said disk 18 may be readily introduced into the neck of the bottle 5. Rising from one side of the disk 18 is a vertical wall 19 of a width substantially the same as that of the strip 1 in the first-mentioned form of the device. The projecting portion of the material forming the wall 19 is then bent at right angles to provide the spur or prong 20 which lies substantially in a plane with the disk 18.

The spring clip member 21 is stamped from the central part of the disk 18 and is bent slightly downward to lie in spaced relation thereto in precisely the same manner as in the first-mentioned form, and its free end 22 is turned downwardly to facilitate the application of the device to the disk 10. In this form of the device it will be seen that the prong or spur 20 may be used as the handle for inserting the disk 10 into the neck of the bottle, or removing the same therefrom.

From the foregoing it will be seen that a simple, strong and cheaply manufactured device is provided, which is adapted to remove or extract caps or tops from the necks of milk or other bottles, to hold them so that they may not become lost, and the device is especially adapted for replacing the said tops or caps within the bottle when only a portion of the contents thereof is to be used.

The device may be stamped with suitable advertising matter and given away by the dealer, by reason of its simplicity and cheapness.

It will be understood that in both forms of the invention, whether the body portion is made in the form of a narrow strip, or a circular disk, in each instance the body portion is formed with a clip to engage the milk bottle cap, and is provided with at least one arm, which is adapted to engage over the upper edge of the milk bottle neck. In the form shown in Figs. 1 to 4, two angular arms are provided, one of which constitutes the handle, and the other a puncturing point.

What is claimed is:—

1. A device of the class described comprising a body portion of a length and shape to extend across a milk bottle and rest upon the bottle cap, said body portion having a clip projecting from its underside, said clip being open at one side and adapted to slip over and engage the inner side of the bottle cap and detachably hold the cap to the body portion.

2. A device of the class described comprising a body portion of a length and shape to extend across a milk bottle and fit down within the neck, said body portion having a spring clip projecting from its underside, said clip being open at one side and adapted to slip over and detachably engage with the bottle cap, and means provided on the body portion to engage over the upper edge of the bottle neck and support the device in position.

3. A device of the class described comprising a body portion of a length and shape to extend across a milk bottle and fit down within the neck, said body portion having a clip to engage the bottle cap, and an angular arm provided on the body portion and engaging over the upper edge of the bottle neck, said arm being pointed.

4. A device of the class described, comprising a body portion of a length and shape to extend across a bottle and fit down within the neck, said body portion having a clip to engage the bottle cap or top, and angular arms provided at diametrically opposite points of the body portion, said arms being adapted to engage over the upper edge of the bottle neck and support the device in position, one of said arms constituting a handle for the device, the other arm being pointed.

5. A bottle stopper extractor and replacer, comprising a body portion adapted to fit crosswise within the neck of a bottle, upwardly and outwardly extending arms adapted to rest on the upper edge of the neck of the bottle and suspend the said body portion therein, and a spring clip provided on the under side thereof and adapted to clamp the bottle cap or top and support the same within the neck of the bottle.

In testimony, that I claim the foregoing as my own, I have hereto affixed my signature in the presence of two witnesses.

ALBERT L. HIGGINS.

Witnesses:
 DOROTHY SHERMAN,
 E. G. MORAN.